(12) United States Patent
Han et al.

(10) Patent No.: US 8,089,606 B2
(45) Date of Patent: Jan. 3, 2012

(54) REFLECTIVE DISPLAY PANEL AND DEVICE

(75) Inventors: Young Ran Han, Suwon-si (KR); Du Sik Park, Suwon-si (KR); Seung Sin Lee, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 492 days.

(21) Appl. No.: 12/382,824

(22) Filed: Mar. 24, 2009

(65) Prior Publication Data

US 2010/0091221 A1 Apr. 15, 2010

(30) Foreign Application Priority Data

Oct. 15, 2008 (KR) .................. 10-2008-0101151

(51) Int. Cl.
 *C09K 19/02* (2006.01)
(52) U.S. Cl. ........................................ 349/183
(58) Field of Classification Search .................. None
 See application file for complete search history.

(56) References Cited

U.S. PATENT DOCUMENTS

| | | | |
|---|---|---|---|
| 5,867,238 A * | 2/1999 | Miller et al. | 349/92 |
| 6,261,650 B1 * | 7/2001 | Kobayashi et al. | 428/1.5 |
| 2006/0134349 A1 * | 6/2006 | Chari et al. | 428/1.1 |
| 2007/0146610 A1 * | 6/2007 | Momoi et al. | 349/144 |
| 2008/0048970 A1 * | 2/2008 | Drzaic et al. | 345/107 |
| 2008/0316401 A1 * | 12/2008 | Chang | 349/114 |
| 2009/0015769 A1 * | 1/2009 | Park | 349/106 |

* cited by examiner

*Primary Examiner* — Timothy L Rude
(74) *Attorney, Agent, or Firm* — Staas & Halsey LLP

(57) ABSTRACT

A reflective display panel is provided. The reflective display panel includes a liquid crystal layer, an upper substrate including a color filter and a transparent substrate, and a lower substrate including an absorption plate which faces a color filter and a reflection plate which faces a transparent substrate. The absorption plate absorbs a first external light, having penetrated the liquid crystal layer via the color filter, when a first voltage is supplied between the color filter and the absorption plate, and the reflection plate reflects a second external light, having penetrated the liquid crystal layer via the transparent substrate, when a second voltage is supplied.

10 Claims, 4 Drawing Sheets

REFLECTIVE DISPLAY PANEL AND DEVICE

CROSS-REFERENCE TO RELATED APPLICATION

This application claims the benefit of Korean Patent Application No. 10-2008-0101151, filed on Oct. 15, 2008, in the Korean Intellectual Property Office, the disclosure of which is incorporated herein by reference.

BACKGROUND

1. Field

Example embodiments relate to a reflective display panel and device, and more particularly, to a reflective display panel and device which may improve an ability to express the colors black and white by having an absorption plate and a reflection plate in a lower substrate of the panel.

2. Description of the Related Art

With rising interest in display devices, various technologies to improve performance of such display devices have been introduced. Recently, with the huge success of Liquid Crystal Displays (LCDs) in the market, LCD manufacturers are competing heavily to come up with technologies to improve the performance of their LCD products.

In such competition, regarding the performance of LCDs, an ability to express the colors black and white is becoming an important issue. Especially among reflective LCDs manufactured using a Polymer Dispersed Liquid Crystal (PDLC), improvement in the ability to express the colors black and white is a significant issue.

The ability to express the colors black and white in reflective LCDs is largely determined by an absorption rate and a reflection rate of the reflective LCD panels. With a good absorption rate of the reflective LCD panels, the ability to express black improves, and the reflective ratio of the reflective LCD panels contributes to the ability to express white.

However, in conventional reflective LCD panels, the higher absorption rate results in a lower reflective ratio, or the higher reflective ratio adversely affects the absorption rate, and thus it is difficult to improve the ability to express both black and white in reflective LCDs.

Accordingly, technology which may improve the ability to express both black and white in reflective LCDs is required.

SUMMARY

According to example embodiments, there may, but not necessarily, be provided a reflective display panel including: a liquid crystal layer including a liquid crystal; an upper substrate being disposed on an upper portion of the liquid crystal layer, and including a color filter and a transparent substrate; and a lower substrate being disposed on a lower portion of the liquid crystal layer, and including an absorption plate facing the color filter and a reflection plate facing the transparent substrate, wherein the absorption plate absorbs a first external light, having penetrated the liquid crystal layer via the color filter, when a first voltage is supplied between the color filter and the absorption plate, and the reflection plate reflects a second external light, having penetrated the liquid crystal layer via the transparent substrate, when a second voltage is supplied.

According to example embodiments, there may, but not necessarily, be provided a reflective display apparatus including: a panel including a liquid crystal layer made of a liquid crystal, an upper substrate being disposed on an upper portion of the liquid crystal layer and including a color filter and a transparent substrate, and a reflection plate being disposed on a lower portion of the liquid crystal and including an absorption plate facing the color filter and a reflection plate facing the transparent substrate; a first voltage supply unit supplying a first voltage between the color filter and the absorption plate; and a second voltage supply unit supplying a second voltage between the transparent substrate and the reflection plate, wherein the absorption plate absorbs a first external light, having penetrated the liquid crystal layer via the color filter, when a first voltage is supplied between the color filter and the absorption plate, and the reflection plate reflects a second external light, having penetrated the liquid crystal layer via the transparent substrate, when a second voltage is supplied.

Accordingly, it is an aspect of the present example embodiments to provide a reflective display panel and reflective display apparatus, having an ability to express black and which colors in a reflective display may be improved.

Additional aspects of example embodiments will be set-forth in part in the description which follows and, in part, will be apparent from the description, or may be learned by practice of the disclosure.

BRIEF DESCRIPTION OF THE DRAWINGS

These and/or other aspects of example embodiments will become apparent and more readily appreciated from the following description, taken in conjunction with the accompanying drawings of which.

DETAILED DESCRIPTION

Figure 1:
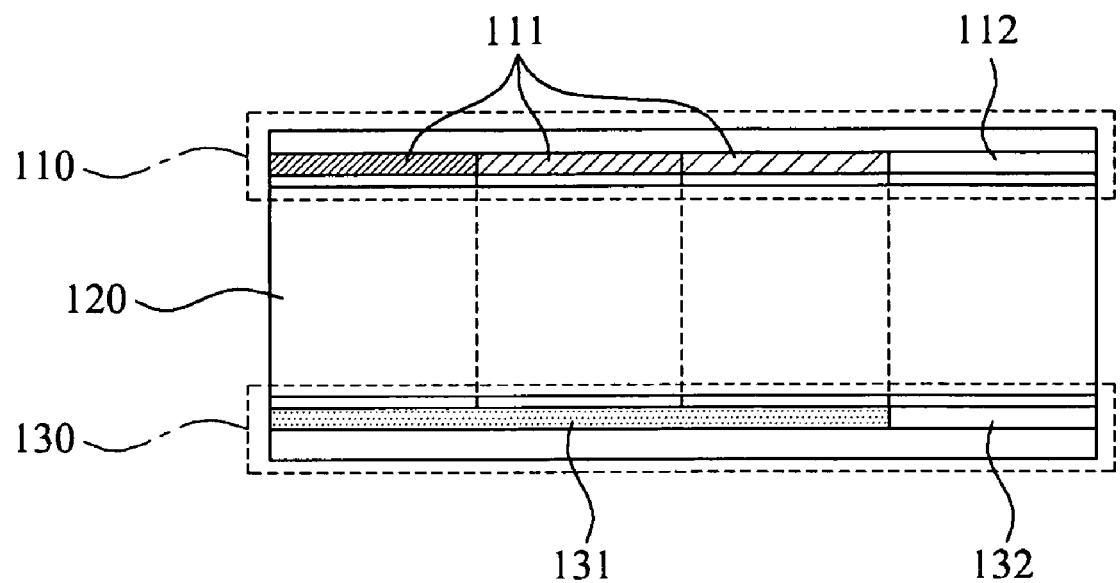
FIG. 1 is a diagram illustrating a reflective display panel according to example embodiments.

Reference will now be made in detail to example embodiments, examples of which are illustrated in the accompanying drawings, wherein like reference numerals refer to the like elements throughout. Example embodiments are described below to explain the present disclosure by referring to the figures.

FIG. 1 is a diagram illustrating a reflective display panel according to example embodiments. Referring to FIG. 1, the reflective display panel according to the example embodiments may include an upper substrate 110, a liquid crystal layer 120, and a lower substrate 130.

The upper substrate 110 is disposed on an upper portion of the liquid crystal layer 120, and includes a color filter 111 and a transparent substrate 112.

According to example embodiments, the color filter 111 may be a red green blue (RGB) color filter.

The lower substrate 130 is disposed on a lower portion of the liquid crystal layer 120, and includes an absorption plate 131 and a reflection plate 132.

Here, the absorption plate 131 and the reflection plate 132 respectively face the color filter 111 and the transparent substrate 112, as illustrated in FIG. 1.

The liquid crystal layer 120 is disposed between the upper substrate 110 and the lower substrate 130 and is made of liquid crystals.

According to example embodiments, the liquid crystal layer 120 may be a Polymer Dispersed Liquid Crystal (PDLC).

When a voltage is supplied between the upper substrate 110 and the lower substrate 130, liquid crystals existing the liquid crystal layer 120 are aligned. Thus, when the voltage is supplied between the upper substrate 110 and the lower substrate 130, an external light penetrates the upper substrate 110, passes through the liquid crystal layer 120 and is delivered to the lower substrate 130.

According to example embodiments, when a first voltage is supplied between the color filter 111 and the absorption plate 131, the absorption plate 131 absorbs a first external light having penetrated the liquid crystal layer 120 via the color filter 111.

According to example embodiments, when a second voltage is supplied between the transparent substrate 112 and the reflection plate 132, the reflection plate 132 absorbs a second external light having penetrated the liquid crystal layer 120 via the transparent substrate 112.

In general, for a reflective display panel to adequately express the color white, a reflection rate of the reflective display panel may be high. Conversely, for a reflective display panel to adequately express black, an absorption rate of the reflective display may be high.

Consequently, the reflective display panel according to the example embodiments may improve an ability to express the colors black and white by locating the lower substrate 130 between the absorption plate 131 and the reflection plate 132, controlling a first voltage and a second voltage, and increasing an absorption rate and a reflection rate of the reflective display panel.

In a related context, according to example embodiments, when an intensity of signals inputted by the reflective display panel increases, a first voltage may be decreased and a second voltage may be increased. Also, when the intensity of inputted signals decreases, a first voltage may, but not necessarily, be increased and a second voltage may, but not necessarily, be decreased.

In detail, when the intensity of inputted signals increases, the first voltage may, but not necessarily, be decreased, thus a transmittance of the first external light also is decreased, consequently the first external light absorbed by the absorption plate 131 may, but not necessarily, be decreased and a reflected light caused from scattering may, but not necessarily, be increased.

Conversely, since the second voltage is increased and a transmittance of the second external light is also increased, the second external light reflected by the reflection plate 132 may be increased.

Consequently, the overall reflection rate of the reflective display panel increases, thus an ability to express the color white in the reflective display panel may be improved.

However, when intensity of the inputted signal decreases, the first voltage is increased, and a transmittance of the first external light is increased, and the first external light absorbed by the absorption plate 131 may be increased.

Conversely, since the second external light is decreased and a transmittance of the second external light is increased, the second external light reflected by the reflection plate 132 may be decreased.

Consequently, an overall absorption rate of the reflective display panel is increased, thus an ability to express black in the reflective display panel may be improved.

The reflective display panel according to the exemplary embodiments may have an improved ability to express the colors white and black by controlling the absorption rate and the reflection rate depending on an intensity of inputted signals.

Here, the inputted signals may be digital signals and have an intensity ranging from 0 to 255 in a case of 8 bit signals.

Figure 2:
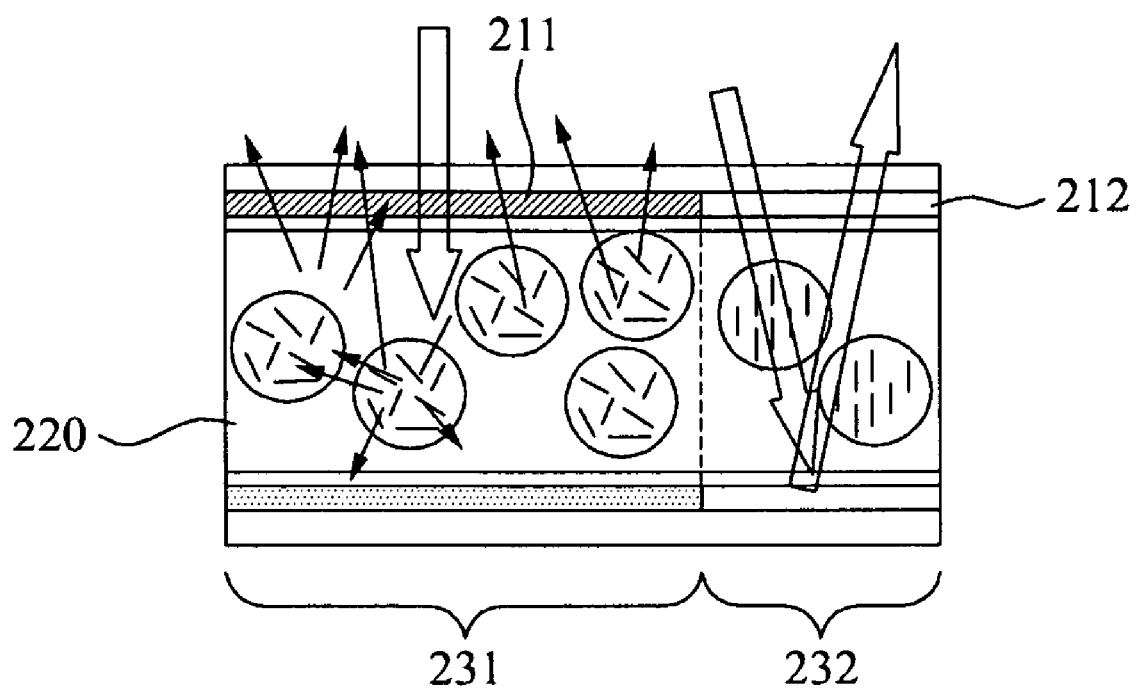
FIG. 2 is a diagram illustrating operations of a reflective display panel for realization of the color white according to example embodiments.

FIG. 2 is a diagram illustrating the operations of a reflective display panel for realization of the color white according to example embodiments.

First, the reflective display panel of the exemplary embodiment illustrated in FIG. 2 is intended for demonstrating a perfect white realization in the reflective display panel, and the present disclosure is not limited to this exemplary embodiment.

Also, it is assumed that a liquid crystal panel 220 of the reflective display panel in FIG. 2 includes of a PDLC.

When a reflective display panel realizes the color white, a first voltage supplied between a color filter 211 and an absorption plate 231 may become 0. Accordingly, liquid crystals located between the color filter 211 and the absorption plate 231 may not be aligned, and external lights entering into the color filter 211 may be mostly scattered. Consequently, there may be little external light absorbed by the absorption plate 231.

Conversely, since a second voltage supplied between a transparent substrate 212 and a reflection plate 232 may become 1 (where the conventions of 0 and 1 may, but not necessarily, be relative values used to compare the first and the second voltages and may not be real numbers), the liquid crystals located between the transparent substrate 212 and the reflection plate 232 may be aligned, thus the external light entering into the transparent substrate 212 may pass through the liquid crystal panel 220. Consequently, the reflective plate 232 reflects most of the external light which penetrates through the liquid crystal panel 220.

Since the overall reflection rates of the reflective display panel are increased, an ability to express the color white in the reflective display panel may be improved.

Figure 3:
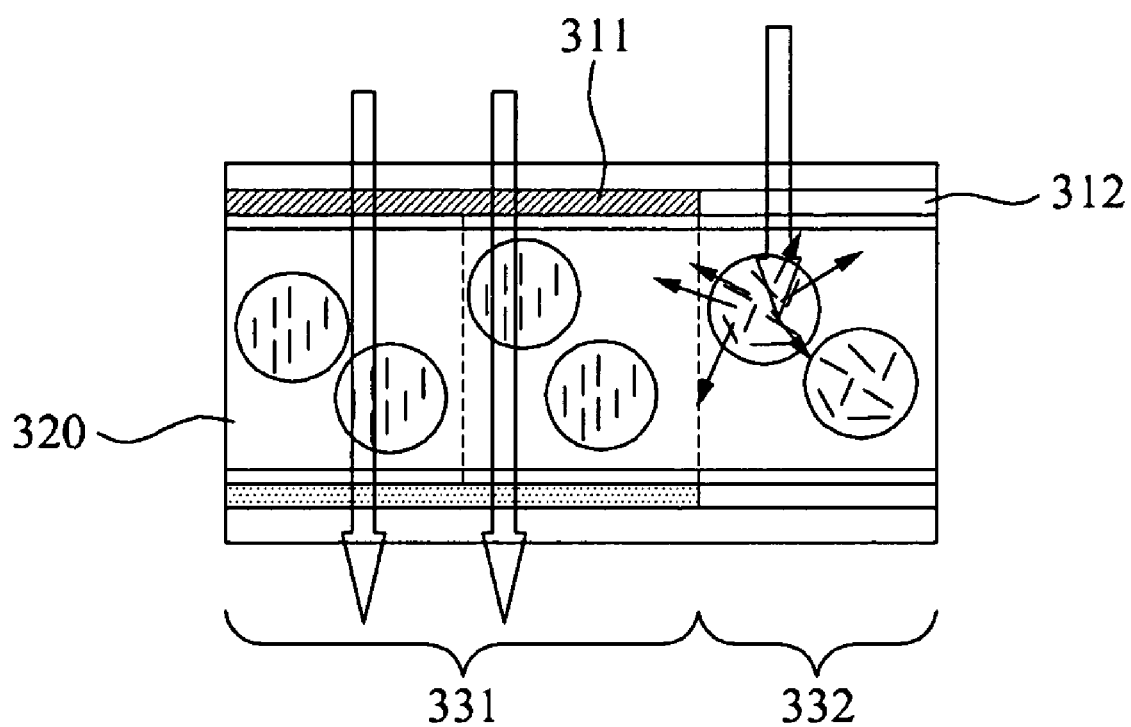
FIG. 3 is a diagram illustrating operations of a reflective display panel for realization of the color black according to example embodiments.

FIG. 3 is a diagram illustrating operations of a reflective display panel for realization of black according to example embodiments.

The reflective display panel in the exemplary embodiment in FIG. 3 is intended for demonstrating a perfect black realization, and the present disclosure is not limited to this exemplary embodiment.

Also, it is assumed that a liquid crystal panel 320 of the display panel of FIG. 3 includes of a PDLC.

When the reflective display panel realizes the color black, a first voltage supplied between a color filter 311 and an absorption plate 331 may become 1. Accordingly, the liquid crystals located between the color filter 311 and the absorption plate 331 may be aligned, and most of the external lights entering into the color filter 311 pass through the liquid crystal panel 320. Consequently, the absorption plate 331 absorbs most of the external lights passing through the liquid crystal panel 320.

Conversely, the second voltage supplied between a transparent substrate 312 and a reflection plate 332 may become 0 (where the conventions of 0 and 1 may, but not necessarily, be relative values used to compare the first and the second voltages and may not be real numbers), the liquid crystals located between the transparent substrate 312 and the reflection plate 332 may not be aligned, thus most of the external lights entering into the transparent substrate 312 may be scattered by liquid crystal molecules. Consequently, there may, but not necessarily, be some external light reflected by the reflection plate 332.

Consequently, since the overall absorption rates of the reflective display panel are increased, an ability to express black in the reflective display panel may be improved.

Figure 4:
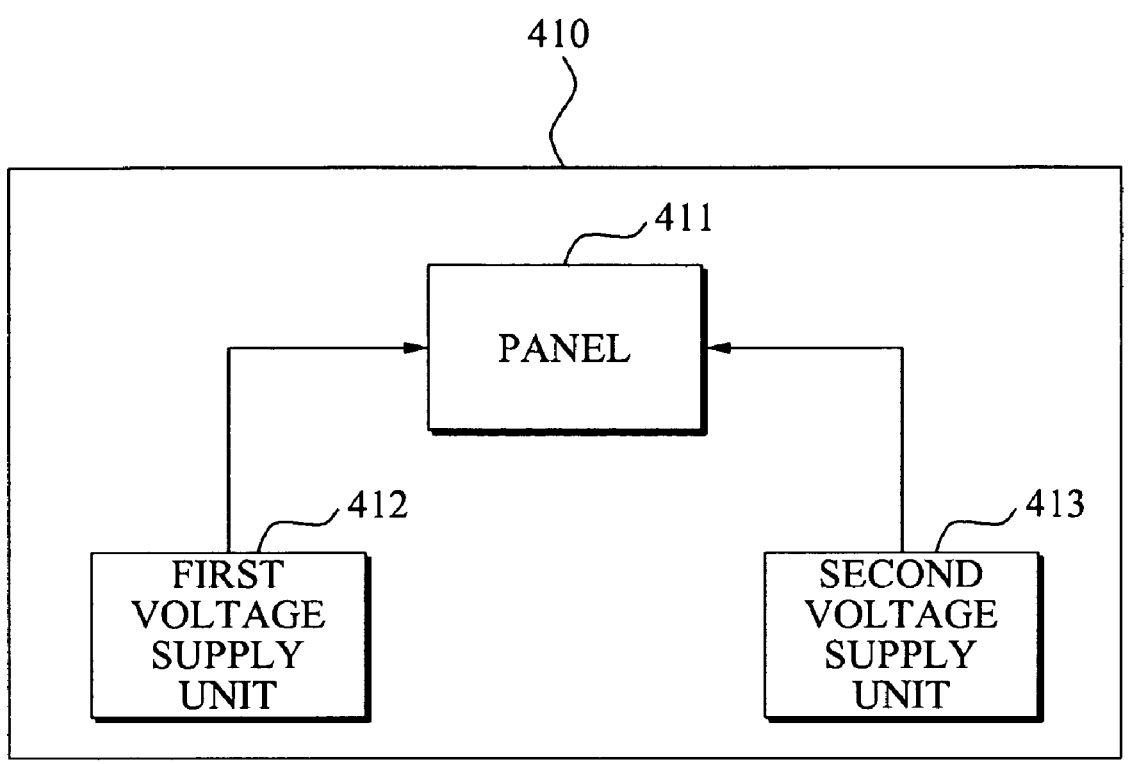
FIG. 4 is a diagram illustrating a reflective display apparatus according to example embodiments.

FIG. 4 is a diagram illustrating a reflective display apparatus 410 according to example embodiments.

The reflective display device 410 may include of a panel 411, a first voltage supply unit 412, and a second voltage supply unit 413.

The panel 411 may include a liquid crystal layer made of a liquid crystal, an upper substrate being disposed on an upper portion of the liquid crystal layer and including a color filter and a transparent substrate, and a lower substrate being disposed on a lower portion of the liquid crystal and including an absorption plate facing the color filter and a reflection plate facing the transparent substrate.

According to example embodiments, the liquid crystals may, but not necessarily, be PDLCs. Also, according to example embodiments, the color filter may, but not necessarily, be an RGB color filter. The first voltage supply unit 412 supplies a first voltage between the color filter and the absorption plate.

Here, when the first voltage is supplied between the color filter and the absorption plate, the absorption plate absorbs a first external light having passed through the crystal liquid layer via the color filter.

The second voltage supply unit 413 supplies a second voltage between the transparent filter and the reflection plate.

Here, when the second voltage is supplied between the transparent filter and the reflection plate, the reflection plate reflects a second external light having passed through the transparent filter and the crystal liquid layer.

According to example embodiments, for the purpose of displaying images, the first voltage supply unit 412 may, but not necessarily, decrease the first voltage when inputted signals entering into the reflective display device 410 increase, and may, but not necessarily, increase the first voltage when the inputted signals decrease.

Also, according to example embodiments, the second voltage supply unit 413 may, but not necessarily, increase the second voltage when the inputted signals increase, and may, but not necessarily, decrease the second voltage when the inputted signals decrease.

Consequently, according to the intensities of the inputted signals, the first voltage supply unit 412 and the second voltage supply unit 413 may improve an ability to express the colors black and white in the reflective display device 410 by controlling the first voltage and the second voltage in an opposing manner.

According to example embodiments, the reflective display device 410 may, but not necessarily, further include a reflection coefficient calculation unit (not shown), which calculates reflection coefficients by referring to intensity of the inputted signal.

Here, according to example embodiments, the second voltage supply unit 413 may, but not necessarily, determine a size of the second voltage by referring to the reflection coefficients.

Also, according to example embodiments, the reflection coefficient calculation unit may, but not necessarily, decrease reflection coefficients when intensity of the inputted signals increases, and also increase reflection coefficients when intensity of the inputted signals decreases.

Here, according to example embodiments, the second voltage supply unit 413 may, but not necessarily, decrease the second voltage when the reflection coefficients increase, and also may increase the second voltage when the reflection coefficients decrease.

In the related context, operations of the reflection coefficient calculation unit and the second voltage supply unit 413 are described in detail below with examples.

First, a first voltage supplied between the color filter and the absorption plate from the first voltage supply unit 412 has a characteristic in which a size of the first voltage may be adjusted inversely to intensity changes of the inputted signals.

Using such a characteristic, it is possible to illustrate a curve graph of the supply of the first voltage depending on the intensity changes of the inputted signals. The reflection coefficient calculation unit calculates the reflection coefficient to be inversely proportional to the adjusting characteristic of the first voltage to supply the second voltage between the transparent substrate and the reflection panel using a similar curve of the supply of the first voltage curve.

As an example, it is assumed that a reflection coefficient is K, when the inputted signal is an RGB inputted signal, and intensities of inputted signals to each type of the sub pixels are Ir, Ig, and Ib. The reflection coefficient calculation unit may calculate the reflection coefficient K via a function f having the reflection coefficient K to be variables of Ir, Ig, Ib.

The reflection coefficient calculation unit calculates a reflection coefficient to be decreased when intensity of the inputted signals increases, and calculates a reflection coefficient to be increased when intensity of the inputted signals decreases, when reflection coefficient K=f(Ir, Ig, Ib). The reflection coefficient calculation unit may determine the function f so that K may be 0 when Ir, Ig and Ib are all 1 and K may be 1 when Ir, Ig and Ib are all 0. However, the conventions of 0 and 1 may, but not necessarily, be relative values used to compare intensities of inputted signals and may not be actual intensities.

Thus, the reflection coefficient calculation unit decreases the reflection coefficient when the reflective display device 410 expresses white, and increases the reflection coefficient when the reflective display device 410 expresses black.

After the reflection coefficient calculation unit completes the calculation of the reflection coefficient, the second voltage supply unit 413 supplies the second voltage between the transparent substrate and the reflection plate so that the second voltage may be inversely proportional to the adjustment characteristic of the reflection coefficients.

In other words, the second voltage supply unit 413 increases the second voltage when the reflection coefficient decreases and decreases the second voltage when the reflection coefficient increases.

Consequently, since the curve of the supply of the second voltage depending on the reflection coefficient value is identical to the curve of the supply of the first voltage, both of the first voltage supply unit 412 and the second voltage supply unit 413 may utilize identical types of the voltage curves.

Although a few example embodiments have been shown and described, the present disclosure is not limited to the described example embodiments. Instead, it may be appreciated by those skilled in the art that changes may be made to these example embodiments without departing from the principles and spirit of the disclosure, the scope of which is defined by the claims and their equivalents.

What is claimed is:
1. A reflective display panel, the panel comprising:
a liquid crystal layer comprising a liquid crystal;
an upper substrate being disposed on an upper portion of the liquid crystal layer, and comprising a color filter and a transparent substrate; and a lower substrate being disposed on a lower portion of the liquid crystal layer, and comprising an absorption plate facing the color filter and a reflection plate facing the transparent substrate, wherein the absorption plate absorbs a first external light, having penetrated the liquid crystal layer via the color filter, when a first voltage is supplied between the color filter and the absorption plate, and the reflection plate reflects a second external light, having penetrated the liquid crystal layer via the transparent substrate, when a second voltage is supplied.

2. The panel of claim 1, wherein the liquid crystal is a polymer dispersed liquid crystal (PDLC).

3. The panel of claim 1, wherein the first voltage is decreased and the second voltage is increased when an intensity of an inputted signal, inputted to display a predetermined image on the display panel, increases, and the first voltage is increased and the second voltage is decreased when the intensity of the inputted signal decreases.

4. The panel of claim 1, wherein the color filter is a red green blue (RGB) color filter.

5. A reflective display apparatus, the apparatus comprising:

a panel including a liquid crystal layer comprising a liquid crystal, an upper substrate being disposed on an upper portion of the liquid crystal layer and comprising a color filter and a transparent substrate, and a lower substrate being disposed on a lower portion of the liquid crystal and comprising an absorption plate facing the color filter and a reflection plate facing the transparent substrate;

a first voltage supply unit supplying a first voltage between the color filter and the absorption plate; and a second voltage supply unit supplying a second voltage between the transparent substrate and the reflection plate, wherein the absorption plate absorbs a first external light, having penetrated the liquid crystal layer via the color filter, when a first voltage is supplied between the color filter and the absorption plate, and the reflection plate reflects a second external light, having penetrated the liquid crystal layer via the transparent substrate, when a second voltage is supplied.

6. The apparatus of claim 5, wherein the liquid crystal is a PDLC.

7. The apparatus of claim 5, wherein the first voltage supply unit decreases the first voltage when an intensity of an inputted signal being inputted to display a predetermined image on the display apparatus increases, and increases the first voltage when the intensity of the inputted signal decreases, and the second voltage supply unit increases the second voltage when the intensity of the inputted signal increases and decreases the second voltage when the intensity of the inputted signal decreases.

8. The apparatus of claim 7, further comprising:

a reflection coefficient calculation unit calculating a reflection coefficient based on the intensity of the inputted signal, wherein the second voltage supply unit determines the second voltage based on the reflection coefficient.

9. The apparatus of claim 8, wherein the reflection coefficient calculation unit calculates the reflection coefficient so as to decrease the reflection coefficient when the intensity of the inputted signal increases and calculates the reflection coefficient so as to increase the reflection coefficient when the intensity of the inputted signal decreases, and the second voltage supply unit decreases the second voltage when the reflection coefficient is increased and increases the second voltage when the reflection coefficient is decreased.

10. The apparatus of claim 5, wherein the color filter is an RGB color filter.

* * * * *